US012288958B2

(12) United States Patent
Endo

(10) Patent No.: US 12,288,958 B2
(45) Date of Patent: Apr. 29, 2025

(54) STRUCTURE, METHOD FOR MANUFACTURING STRUCTURE, LASER DEVICE, AND LASER SYSTEM

(71) Applicant: FUJIKURA LTD., Tokyo (JP)

(72) Inventor: Tomohisa Endo, Sakura (JP)

(73) Assignee: Fujikura Ltd., Tokyo (JP)

( * ) Notice: Subject to any disclaimer, the term of this patent is extended or adjusted under 35 U.S.C. 154(b) by 905 days.

(21) Appl. No.: 17/428,497

(22) PCT Filed: Dec. 19, 2019

(86) PCT No.: PCT/JP2019/049734
§ 371 (c)(1),
(2) Date: Aug. 4, 2021

(87) PCT Pub. No.: WO2020/162057
PCT Pub. Date: Aug. 13, 2020

(65) Prior Publication Data
US 2022/0029375 A1   Jan. 27, 2022

(30) Foreign Application Priority Data

Feb. 5, 2019 (JP) ................................. 2019-018934

(51) Int. Cl.
*H01S 3/067* (2006.01)
*B23K 26/064* (2014.01)
(Continued)

(52) U.S. Cl.
CPC ........ *H01S 3/06725* (2013.01); *B23K 26/064* (2015.10); *G02B 6/2551* (2013.01);
(Continued)

(58) Field of Classification Search
CPC ...... G02B 6/2551; G02B 6/262; G02B 6/327; G02B 6/3624; G02B 6/4206;
(Continued)

(56) References Cited

U.S. PATENT DOCUMENTS 6,324,326 B1 * 11/2001 Dejneka ............... G02B 6/1228
359/341.1
7,580,609 B1   8/2009 Pannell
(Continued)

FOREIGN PATENT DOCUMENTS

CN   101647162 A   2/2010
CN   102576122 A   7/2012
(Continued)

OTHER PUBLICATIONS

International Preliminary Report on Patentability issued in corresponding International Application No. PCT/JP2019/049734, mailed on Aug. 19, 2021 (11 pages).
(Continued)

*Primary Examiner* — Daniel Petkovsek
(74) *Attorney, Agent, or Firm* — Osha Bergman Watanabe & Burton LLP

(57) ABSTRACT

A structure includes: an optical fiber including a large-diameter section that is larger in diameter than a remainder of the optical fiber; and a glass block joined to a first end face of the large-diameter section of the optical fiber. The large-diameter section includes a tapering section that: includes, as part of a surface thereof, a sloping surface sloping at an angle of more than 0° and less than 90° to an optical axis of the optical fiber; and is disposed in a portion other than the first end face.

7 Claims, 6 Drawing Sheets

(51) Int. Cl.
    *G02B 6/255*     (2006.01)
    *G02B 6/26*     (2006.01)
    *G02B 6/36*     (2006.01)
    *G02B 6/42*     (2006.01)
    *G02B 6/32*     (2006.01)

(52) U.S. Cl.
    CPC .......... *G02B 6/262* (2013.01); *G02B 6/3624* (2013.01); *G02B 6/4206* (2013.01); *H01S 3/06704* (2013.01); *H01S 3/06716* (2013.01); *G02B 6/327* (2013.01)

(58) Field of Classification Search
    CPC ............. H01S 3/06704; H01S 3/06716; H01S 3/06725; B23K 26/064
    See application file for complete search history.

(56) References Cited

U.S. PATENT DOCUMENTS

| | | | |
|---|---|---|---|
| 9,360,643 B2 * | 6/2016 | Rinzler | .................. G02B 6/262 |
| 9,444,215 B1 * | 9/2016 | Gapontsev | ........ H01S 3/094038 |
| 9,667,023 B2 * | 5/2017 | Fomin | ....................... H01S 3/10 |
| 2004/0151466 A1 | 8/2004 | Crossman-Bosworth et al. | |
| 2014/0079363 A1 | 3/2014 | Hsu et al. | |
| 2014/0314106 A1 | 10/2014 | Fomin et al. | |
| 2019/0324220 A1 * | 10/2019 | Tanaka | .................. H01S 3/0064 |

FOREIGN PATENT DOCUMENTS

| | | | | |
|---|---|---|---|---|
| CN | 105027367 | A | | 11/2015 |
| CN | 105659128 | A | | 6/2016 |
| CN | 109149335 | A * | 1/2019 | ............. G02B 6/262 |
| EP | 3617760 | A1 | | 3/2020 |
| JP | S58-125626 | A | | 7/1983 |
| JP | 2000-321470 | A | | 11/2000 |
| JP | 2003-315612 | A | | 11/2003 |
| JP | 2004-341448 | A | | 12/2004 |
| JP | 2006-209085 | A | | 8/2006 |
| JP | 2007-293298 | A | | 11/2007 |
| JP | 2013-007959 | A | | 1/2013 |
| JP | 2014123147 | A * | 7/2014 | ......... A61B 1/00117 |
| JP | 2014-165401 | A | | 9/2014 |
| JP | 2014-191276 | A | | 10/2014 |
| JP | 2015-34942 | A | | 2/2015 |
| JP | 2016-513873 | A | | 5/2016 |
| JP | 2017-191194 | A | | 10/2017 |
| JP | 2017-223782 | A | | 12/2017 |
| JP | 2018-136379 | A | | 8/2018 |
| WO | 2018/003604 | A1 | | 1/2018 |
| WO | 2018/199339 | A1 | | 11/2018 |

OTHER PUBLICATIONS

International Search Report issued in corresponding International Application No. PCT/JP2019/049734, mailed on Mar. 24, 2021 (2 pages).

* cited by examiner

STRUCTURE, METHOD FOR MANUFACTURING STRUCTURE, LASER DEVICE, AND LASER SYSTEM

TECHNICAL FIELD

The present invention relates to a structure that includes an optical fiber and a glass block joined to one end face of the optical fiber.

BACKGROUND

In recent years, the following laser processing apparatus is widely used: a laser processing apparatus which irradiates a workpiece with a high-power laser beam emitted by a laser light source and which thereby processes the workpiece.

Such a laser processing apparatus includes the laser light source, a delivery fiber, a glass block, and an optical system. For example, the delivery fiber is a quartz glass-based optical fiber, and the glass block is made of quartz glass.

The delivery fiber guides the laser beam, which has been emitted by the laser light source as stated earlier, to the vicinity of the workpiece. The glass block outputs the laser beam, which has been guided by the delivery fiber, toward the workpiece. The glass block is connected to one end face of the delivery fiber, and therefore is also called an endcap of the delivery fiber. The optical system focuses the laser beam, which has been outputted from the glass block, on the surface of the workpiece.

Patent Literature 1 discloses, in FIG. 3, a structure which includes an optical fiber and a glass block and in which the glass block is joined to one end face of the optical fiber. With regard to the laser processing apparatus as described earlier, a laser beam which has been reflected by the workpiece and caused to re-enter the glass block by the foregoing optical system is an issue, because the laser beam is a high-power laser beam.

Patent Literature 1 indicates that, in the structure disclosed in FIG. 3, the optical fiber-side end face of the glass block is constituted by a curved surface, thereby making it possible to prevent or reduce the effect of reflected light which has re-entered the glass block but has not re-entered the optical fiber on the coating of the optical fiber, resin that fixes the optical fiber, and the like.

PATENT LITERATURE

[Patent Literature 1]
Japanese Patent Application Publication, Tokukai, No. 2017-191194

However, the structure disclosed in FIG. 3 of Patent Literature 1 has an issue in that the joint where the optical fiber and the glass block are joined has low mechanical strength.

In a structure which includes an optical fiber and a glass block jointed to one end face of the optical fiber, the strength of the joint where the optical fiber and the glass block are joined may be increased.

SUMMARY

A structure in accordance with one or more embodiments of the present invention is a structure including an optical fiber and a glass block joined to one end face of the optical fiber, the optical fiber including a large-diameter section which includes the one end face and which is larger in diameter than the remaining portion excluding the large-diameter section, the large-diameter section including a tapering section which has, as part of a surface thereof, a sloping surface sloping at an angle of more than 0° and less than 90° to an optical axis of the optical fiber and which is located in a portion other than the one end face.

A production method in accordance with one or more embodiments of the present invention is a method of producing a structure that includes: a delivery fiber; a bridge fiber which is joined to one end face of the delivery fiber and which is larger in diameter than the delivery fiber; and a glass block which is joined to one end face of the bridge fiber. In the structure, the bridge fiber includes a tapering section which has, as part of a surface thereof, a sloping surface sloping at an angle of more than 0° and less than 90° to an optical axis of the bridge fiber and which is located in a portion other than the one end face. The present production method includes the step of fusion splicing the delivery fiber and the tapering section of the bridge fiber with use of an optical fiber fusion splicer.

A production method in accordance with one or more embodiments of the present invention is a method of producing a structure that includes: a delivery fiber; a small glass tube which covers a section including one end face of the delivery fiber; and a glass block which is joined to the one end face of the delivery fiber and which is joined to one end face of the small glass tube. In the structure, the small glass tube includes a tapering section which has, as part of a surface thereof, a sloping surface sloping at an angle of more than 0° and less than 90° to an optical axis of the delivery fiber and which is located in a portion other than the one end face. The present production method includes the steps of: inserting the delivery fiber into a small hole in the small glass tube; and fixing at least part of an inner surface of the small glass tube and at least part of an outer surface of a section of the delivery fiber which section has been inserted in the small hole by at least partially heating the small glass tube which has the delivery fiber inserted therein.

One or more embodiments of the present invention make it possible, in a structure which includes an optical fiber and a glass block jointed to one end face of the optical fiber, to increase the strength of the joint where the optical fiber and the glass block are joined.

BRIEF DESCRIPTION OF THE DRAWINGS (a) of FIG. 1 is a longitudinal cross-sectional view of a structure in accordance with one or more embodiments of the present invention. (b) of FIG. 1 is a plan view seen from an exit face of a glass block included in the structure illustrated in (a) of FIG. 1.

FIG. 2 is a longitudinal cross-sectional view of a structure in accordance with one or more embodiments of the present invention.

(a) of FIG. 3 is a longitudinal cross-sectional view of an output head including a structure in accordance with an Example of the present invention. (b) of FIG. 3 is a longitudinal cross-sectional view of an output head including a structure in accordance with a Comparative Example for comparison with the present invention.

(a) of FIG. 4 is a graph showing the temperature of a light damper included in the structure in accordance with the Example of the present invention and the temperature of a light damper included in the structure in accordance with the Comparative Example for comparison with the present invention. (b) and (c) of FIG. 4 are images indicative of a near field pattern (NFP) of a laser beam outputted from the structure in accordance with the Example of the present invention and a far field pattern (FFP) of the laser beam, respectively. (d) and (e) of FIG. 4 are images indicative of an NFP and an FFP of a laser beam outputted from the structure in accordance with the Comparative Example for comparison with the present invention, respectively.

DETAILED DESCRIPTION

Figure 1:
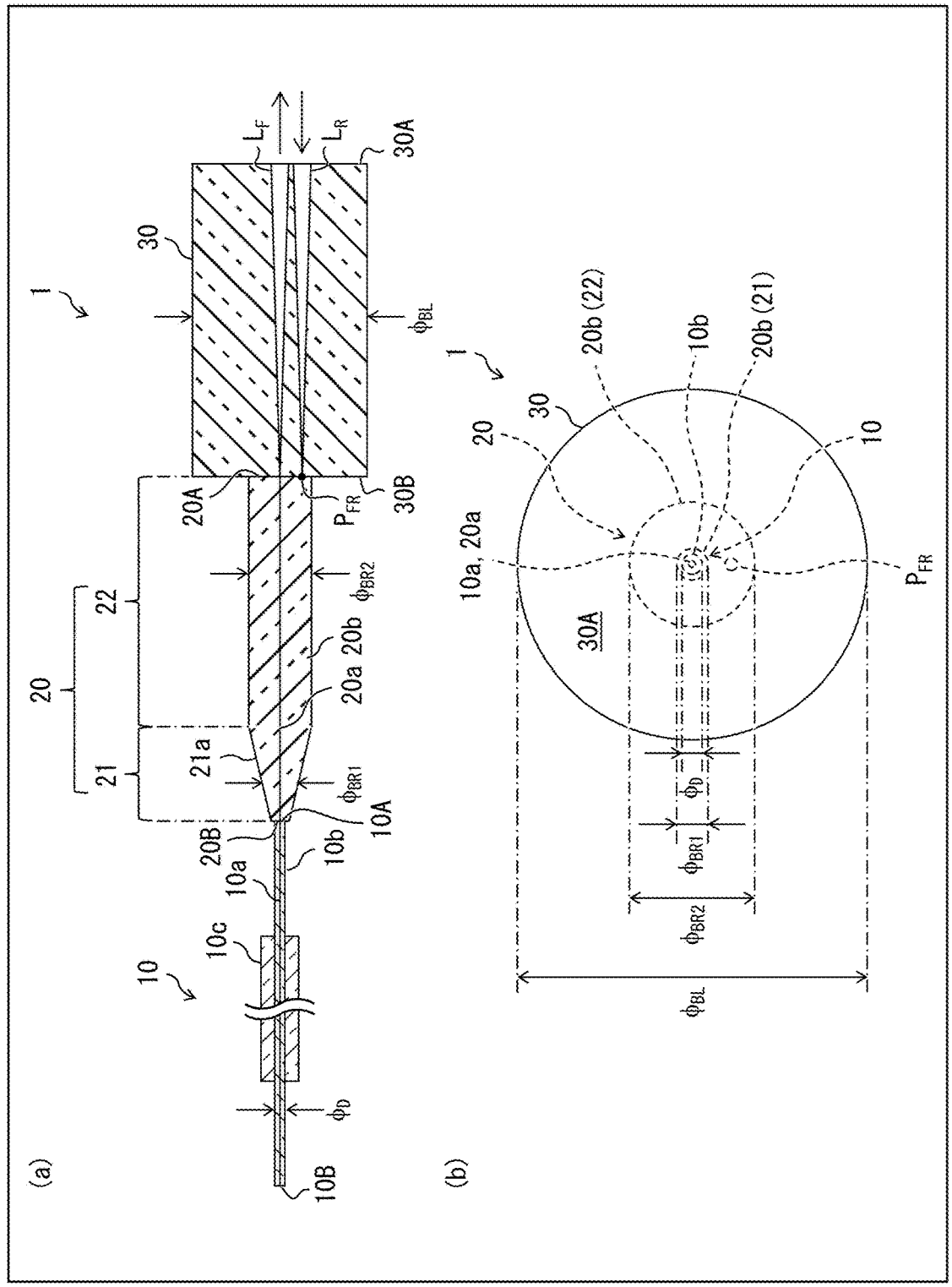

The following description will discuss a structure 1 in accordance with one or more embodiments of the present invention, with reference to FIG. 1. (a) of FIG. 1 is a longitudinal cross-sectional view of the structure 1. (b) of FIG. 1 is a plan view seen from one end face 30A which is an exit face of a glass block 30 included in the structure 1.

As illustrated in (a) of FIG. 1, the structure 1 includes a delivery fiber 10, a bridge fiber 20, and a glass block 30. The delivery fiber 10 and the bridge fiber 20 are one or more embodiments of the optical fiber recited in the claims.

The structure 1 is used as, for example, an output section of a laser apparatus (such as a laser processing apparatus). In such a case, a laser beam $L_F$ emitted by a laser light source (such as a fiber laser) (1) is guided through the delivery fiber 10 and the bridge fiber 20, (2) passes through the glass block 30, and (3) is outputted through the one end face 30A of the glass block 30 to the outside (such as a workpiece). That is, the glass block 30 functions as an output head (such as a working head) of the laser apparatus.

The other end face 30B of the glass block 30 has, joined (e.g., fusion spliced) thereto, one end face 20A of the bridge fiber 20 (one end face of the optical fiber). The other end face 20B of the bridge fiber 20 has one end face 10A of the delivery fiber 10 joined (e.g., fusion spliced) thereto. The other end face 10B of the delivery fiber 10 (the other end face of the optical fiber) can be joined (for example, fusion spliced) to an output port of the laser light source.

The delivery fiber 10 includes a core 10a, a cladding 10b, and a coating 10c. The core 10a is a columnar (for example, circular rod-shaped) structure composed of glass (for example, quartz glass). The cladding 10b is a tubular (for example, circular tube-shaped) structure composed of glass (for example, quartz glass). The coating 10c is a tubular (for example, circular tube-shaped) structure composed of resin (for example, ultraviolet-curing resin). Note that the coating 10c is absent in the vicinities of the end faces 10A and 10B of the delivery fiber 10.

The core 10a and the cladding 10b are united such that the inner surface of the cladding 10b covers the outer surface of the core 10a. One of or both of the core 10a and the cladding 10b is/are doped with a dopant for making the refractive index of the core 10a larger than the refractive index of the cladding 10b or for making the refractive index of the cladding 10b smaller than the refractive index of the core 10a. The diameter $\varphi_D$ of the delivery fiber 10 is substantially uniform throughout the whole length, and is, for example, 360 μm.

The bridge fiber 20 is a large-diameter fiber located between the delivery fiber 10 and the glass block 30. The bridge fiber 20 includes a core 20a and a cladding 20b. The core 20a is a columnar (for example, circular rod-shaped) structure composed of glass (for example, quartz glass). The cladding 20b is a tubular (for example, circular tube-shaped) structure composed of glass (for example, quartz glass). The core 20a and the cladding 20b are united such that the inner surface of the cladding 20b covers the outer surface of the core 20a. One of or both of the core 20a and the cladding 20b is/are doped with a dopant for making the refractive index of the core 20a larger than the refractive index of the cladding 20b or for making the refractive index of the cladding 20b smaller than the refractive index of the core 20a.

The refractive index of the core 20a may be equal to or substantially equal to the refractive index of the core 10a (the refractive indices are equal in the embodiments described here), and the refractive index of the cladding 20b may be equal to or substantially equal to the refractive index of the cladding 10b (the refractive indices are equal in the embodiments described here).

The diameter of the core 20a may be equal to or substantially equal to the diameter of the core 10a (the diameters are equal in the embodiments described here). In one or more embodiments, the cladding 20b is thicker than that of a typical optical fiber, thereby achieving an increase in diameter of the bridge fiber 20.

The bridge fiber 20 includes: a tapering section 21 that includes the other end face 20B; and a uniform-diameter portion 22 that includes the one end face 20A.

The tapering section 21 is configured such that its diameter $\varphi_{BR1}$ increases with increasing distance from the other end face 20B. In one or more embodiments, the tapering section 21 is in the shape of a truncated cone that increases in diameter $\varphi_{BR1}$ with increasing distance from the other end face 20B and with decreasing distance from the one end face 20A. As such, the diameter $\varphi_{BR1}$ changes with the distance from the other end face 20B (or with the distance from the one end face 20A), within the range of $\varphi_D < \varphi_{BR1} < \varphi_{BR2}$. In a case of a configuration in which the diameter $\varphi_{BR1}$ at the other end face is equal to the diameter $\varphi_D$, the diameter $\varphi_{BR1}$ changes within the range of $\varphi_D < \varphi_{BR1} < \varphi_{BR2}$.

The bridge fiber 20 is configured such that the diameter $\varphi_{BR1}$ at the other end face 20B is equal to or larger than the diameter $\varphi_D$ of the delivery fiber 10. In one or more embodiments, the bridge fiber 20 is configured such that the diameter $\varphi_{BR1}$ at the other end face 20B is larger than the diameter $\varphi_D$ of the delivery fiber 10, and the diameter $\varphi_{BR1}$ at the other end face 20B (that is, the minimum value of the diameter $\varphi_{BR1}$) is, for example, 700 μm. On the other hand, the diameter $\varphi_{BR1}$ at the boundary plane between the tapering section 21 and the uniform-diameter portion 22 (that is, the maximum value of the diameter $\varphi_{BR1}$) is, for example, 4 mm.

As has been described, the delivery fiber 20 is configured such that the diameter $\varphi_{BR1}$ at the other end face 20B is larger than the diameter $\varphi_D$ of the delivery fiber 10. This makes it possible to fusion splice the delivery fiber 10 and the bridge fiber 20 such that the one end face 10A of the delivery fiber 10 is enclosed by the perimeter of the other end face 20B of the bridge fiber 20. With this configuration, it is possible to fusion splice the entire one end face 10A to the other end face 20B, and therefore the structure 1 is capable of increasing the strength of the joint where the delivery fiber 10 and the bridge fiber 20 are joined.

Note that the bridge fiber 20 can be produced from, for example, an originally circular rod-shaped bridge fiber by grinding a portion around the other end face of the circular rod-shaped bridge fiber into a cone. In the bridge fiber 20 thus obtained through the grinding, the central axis of the tapering section 21 in the form of a truncated cone (that is, the central axis of the bridge fiber 20) may coincide with the central axis of the core 10a; however, there may be cases in which the central axis of the tapering section 21 in the form of a truncated cone (that is, the central axis of the bridge fiber 20) does not coincide with the central axis of the core 10a because of processing variations that could occur during grinding. By employing a configuration in which the diameter $\varphi_{BR1}$ at the other end face 20B is larger than the diameter $\varphi_D$ of the delivery fiber 10, it is possible to eliminate the likelihood that the one end face 10A will extend out over the perimeter of the other end face 20B and the joint, where the delivery fiber 10 and the bridge fiber 20 are joined, will decrease in area (in other words, the joint will decrease in strength), even in cases where the central axis of the tapering section 21 and the central axis of the core 10a do not coincide with each other.

Note, however, that, in a case where the one end face 10A and the other end face 20B are fusion spliced with use of an optical fiber fusion splicer, it is necessary that the diameter $\varphi_{BR1}$ at the other end face 20B be within a predetermined range within which fusion splicing using an optical fiber fusion splicer can be carried out. A predetermined range within which fusion splicing using an optical fiber fusion splicer can be carried out is a predetermined range specific to each optical fiber fusion splicer, and an example thereof is the range of 50 µm to 1000 µm, inclusive. A diameter $\varphi_{BR1}$ of 700 µm, employed in one or more embodiments, is within this predetermined range within which fusion splicing using an optical fiber fusion splicer can be carried out.

As has been described, the diameter $\varphi_{BR1}$ at the other end face 20B can be selected as appropriate, provided that the diameter $\varphi_{BR1}$ is larger than the diameter $\varphi_D$ of the delivery fiber 10 and that the diameter $\varphi_{BR1}$ is within the predetermined range within which fusion splicing using an optical fiber fusion splicer can be carried out.

The uniform-diameter portion 22 is configured such that the diameter $\varphi_{BR2}$ thereof is substantially uniform throughout the whole length from the boundary plane between the tapering section 21 and the uniform-diameter portion 22 to the one end face 20A. In one or more embodiments, the uniform-diameter portion 22 is in the shape of a circular rod. The diameter $\varphi_{BR2}$ of the uniform-diameter portion 22 is, for example, 4 mm.

A section of the bridge fiber 20 in which section the diameter $\varphi_{BR2}$ of the bridge fiber 20 is larger than the diameter $\varphi_D$ of the delivery fiber 10 is one or more embodiments of the large-diameter section recited in the claims. In one or more embodiments, the entirety of the bridge fiber 20 except for the other end face 20B corresponds to the large-diameter section.

The tapering section 21 is configured such that the angle between a sloping surface 21a thereof and the optical axis of the bridge fiber 20 is more than 0° and less than 90°. The smaller the angle between the sloping surface 21a and the optical axis of the bridge fiber 20, the greater the extent to which the heat capacity of the other end face 20B can be reduced. On the contrary, the greater the angle between the sloping surface 21a and the optical axis of the bridge fiber 20, the greater the extent to which the total length (dimension in a direction along the central axis of the bridge fiber 20) of the tapering section 21 can be reduced.

The one end face 10A of the delivery fiber 10 and the other end face 20B of the bridge fiber 20 may be fusion spliced using an optical fiber fusion splicer, as will be described later. The maximum power of the optical fiber fusion splicer is preset according to the specifications of the optical fiber fusion splicer. Therefore, in a case where the heat capacity of the other end face 20B is greater than the value up to which fusion can be caused by the maximum power, the optical fiber fusion splicer is not capable of fusing the other end face 20B, and is not capable of fusion splicing the delivery fiber 10 and the bridge fiber 20.

The delivery fiber 10 and the bridge fiber 20 can be fusion spliced using an optical fiber fusion splicer, by appropriately setting the heat capacity of the other end face 20B within a range lower than the value up to which fusion can be caused by the maximum power of the optical fiber fusion splicer. In one or more embodiments, 15° is employed as an example of the angle between the sloping surface 21a and the optical axis of the bridge fiber 20 at which the optical fiber fusion splicer can be used. Note that, in one or more embodiments, the delivery fiber 10 and the bridge fiber 20 are joined such that the optical axis of the bridge fiber 20 and the optical axis of the delivery fiber 10 coincide with each other. Therefore, the optical axis of the bridge fiber 20 is an example of the optical axis of the optical fiber recited in the claims.

In one or more embodiments, the bridge fiber 20 whose tapering section 21 is in the shape of a truncated cone is obtained from an originally circular rod-shaped bridge fiber by grinding a portion around the other end face of the circular rod-shaped bridge fiber into a cone. An appropriate selection of the grain size of a grindstone for use in grinding makes it possible to roughen the sloping surface 21a of the tapering section 21 like, for example, the surface of ground glass.

The glass block 30 is a structure composed of glass (for example, quartz glass) in the form of a block (for example, in the form of a circular rod). The diameter $\varphi_{BL}$ of the glass block 30 is set such that the diameter $\varphi_{BL}$ is larger than the diameter $\varphi_{BR2}$ of the uniform-diameter portion 22 of the bridge fiber 20 (see FIG. 1). The refractive index of the glass block 30 is equal to or substantially equal to the refractive index of the core 10a of the delivery fiber 10 and the refractive index of the core 20a of the bridge fiber 20, and is higher than the refractive index of the cladding 10b of the delivery fiber 10 and the refractive index of the cladding 20b of the bridge fiber 20. The one end face 20A of the bridge fiber 20 and the other end face 30B of the glass block 30 are joined (for example, fusion spliced).

Note that one or more embodiments have been described on the assumption that the optical fiber recited in the claims is composed of the delivery fiber 10 and the bridge fiber 20 joined to the one end face 10A of the delivery fiber 10. However, the optical fiber recited in the claims may comprise a single optical fiber made up of the delivery fiber 10 and the bridge fiber 20 which are integrally molded. In such a case, a single optical fiber made up of the delivery fiber 10 and the bridge fiber 20 which are integrally molded can be obtained by making the cladding 10b thicker in one end portion of the delivery fiber 10 than in the remaining portion of the delivery fiber 10.

[Summary of Structure 1]

A structure 1 configured as has been described includes: an optical fiber (delivery fiber 10 and bridge fiber 20); and a glass block 30 which is joined to one end face (one end face 20A of bridge fiber 20) of the optical fiber (delivery fiber 10 and bridge fiber 20).

The optical fiber (delivery fiber 10 and bridge fiber 20) includes a large-diameter section (bridge fiber 20) which includes the one end face (one end face 20A) and which has a diameter (diameter $\varphi_{BR1}$ and diameter $\varphi_{BR2}$) larger than the diameter of the remaining portion excluding the large-diameter section (i.e. diameter $\varphi_D$ of the delivery fiber 10), and the large-diameter section includes a tapering section 21 which has, as part of a surface thereof, a sloping surface 21a sloping at an angle of more than 0° and less than 90° to the optical axis of the optical fibers (delivery fiber 10 and bridge fiber 20) and which is located in a portion other than the one end face 20A.

With the above configuration, the diameter $\varphi_{BR2}$ at the one end face 20A of the bridge fiber 20 joined to the glass block 30 is larger than the diameter $\varphi_D$ at the other end face 10B of the delivery fiber 10. Therefore, the structure 1 is capable of increasing the strength of the joint where the bridge fiber 20 and the glass block 30 are joined, compared to a conventional structure in which the delivery fiber 10 is directly joined to the glass block 30.

In addition, the propagation direction of reflected light $L_R$ which has entered the bridge fiber 20 through the glass block 30 is diverted from a direction along the optical axes of the delivery fiber 10 and the bridge fiber 20, because the reflected light $L_R$ is refracted at the sloping surface 21a when leaking out of the bridge fiber 20 through the sloping surface 21a of the tapering section 21. Therefore, the structure 1 is capable of preventing or reducing, for example, the effect of the reflected light $L_R$ on the coating 10c of the delivery fiber 10. As illustrated in (a) of FIG. 3, in a case where the structure 1 is used together with a housing 2, a light damper 3, and a resin block 4 to form an output head, the structure 1 is capable of reducing the power of a portion of the reflected light $L_R$ which portion has entered the bridge fiber 20 and is incident on the light damper 3. As a result, it is possible to reduce an increase in the temperature of the light damper 3, and thus possible to prevent or reduce the effect of the reflected light $L_R$ on the resin block 4 fixing the delivery fiber 10, the coating 10c, and the like.

As such, the structure 1 is capable of, in a structure that includes the optical fiber (delivery fiber 10 and bridge fiber 20) and the glass block 30 joined to the one end face (one end face 20A of bridge fiber 20) of the optical fiber, increasing the strength of the joint where the bridge fiber 20 and the glass block 30 are joined, and further capable of preventing or reducing the effect of the reflected light $L_R$ on the coating 10c, resin fixing the optical fiber, and the like.

Furthermore, the reflected light $L_R$ which has been incident on the one end face 30A of the glass block 30 again is propagated through the glass block 30 in the opposite direction while converging, and substantially focuses at a focal point $P_{FR}$ on the other end face 30B of the glass block 30.

With the above configuration, since the diameter $\varphi_{BR2}$ (4 mm in the embodiments described here) is larger than the diameter $\varphi_D$, the one end face 20A of the bridge fiber 20 (which can also be referred to as one end face of the large-diameter section) can cover an area of the other end face 30B of the glass block 30 in which area the reflected light $L_R$ can substantially focus (i.e., area where the focal point $P_{FR}$ can be located).

In a case where, for example, a foreign matter attaches itself to the other end face 30B of the glass block 30 and where the location of the foreign matter and the location of the focal point $P_{FR}$ coincide with each other, the foreign matter may absorb the reflected light $L_R$ and may become too hot. In the structure 1, the area where the focal point $P_{FR}$ can be located is covered by the one end face 20A of the bridge fiber 20 as described earlier, making it possible to reduce the likelihood that a foreign matter will attach itself to the area where the focal point $P_{FR}$ can be located.

Furthermore, in the structure 1, the shape of the tapering section 21 may be a truncated cone that increases in diameter $\varphi_{BR1}$ with increasing distance from the other end face 20B and with decreasing distance from the one end face 20A.

With the above configuration, the tapering section 21 has a shape that is isotropic about the optical axis of the optical fiber (optical axis of the delivery fiber 10 and the optical axis of the bridge fiber 20). Therefore, reflected light $L_R$ refracted at the sloping surface 21a of the tapering section 21 leaks out of the bridge fiber 20 through the sloping surface 21a in an isotropic manner. This makes it possible to disperse the leaked reflected light $L_R$ without concentrating at one location, and thus possible to further reduce the effect of the reflected light $L_R$ on the coating 10c, resin fixing the optical fibers, and the like.

Note that the shape of the tapering section 21 is not limited to the above-described truncated cone. The truncated cone is a shape obtained by rotating an isosceles trapezoid about a straight line connecting the midpoints of the opposite bases of the isosceles trapezoid. Note, however, that the shape of the tapering section 21 may be, for example, a shape obtained by rotating a semicircle or a semi-ellipsoid about a straight line that halves the area of the semicircle or semi-ellipsoid.

Furthermore, the shape of the tapering section 21 does not need to be a shape that is isotropic about an axis. The shape of the tapering section 21 which is not isotropic about an axis can be, for example, a shape obtained by halving a circular rod at a plane that intersects the central axis of the circular rod at an angle (of more than 0° and less than 90°).

Furthermore, in the structure 1 the sloping surface 21a of the tapering section 21 may be at least partially roughened.

With the above configuration, reflected light $L_R$ which leaks out of the bridge fiber 20 through the sloping surface 21a is scattered in various directions. Therefore, the structure 1 is capable of dispersing the leaked reflected light $L_R$, and is thus capable of further reducing the effect of the reflected light $L_R$ on the coating 10c, resin fixing the optical fibers, and the like.

Furthermore, as described earlier, the optical fiber may comprise: the delivery fiber 10 which is substantially uniform in diameter $\varphi_D$; and the bridge fiber 20 which is located between the delivery fiber 10 and the glass block 30 and which forms the large-diameter section.

With the above configuration, the bridge fiber 20 located between the delivery fiber 10 and the glass block 30 can be used to form the large-diameter section. The formation of the large-diameter section using the bridge fiber 20 makes it possible to prevent or reduce the distortion of the beam profile compared to cases where a small glass tube 120 (described later, see FIG. 2) is used to form the large-diameter section.

Furthermore, in a case where the bridge fiber 20 is used to form the large-diameter section, the diameter $\varphi_{BR1}$ at the other end face 20B of the bridge fiber 20 may be included within a predetermined range within which fusion splicing using an optical fiber fusion splicer can be carried out. When the diameter $\varphi_{BR1}$ is included within a predetermined range within which fusion splicing using an optical fiber fusion splicer can be carried out, the delivery fiber 10 and the bridge fiber 20 can be fusion spliced using an optical fiber fusion splicer. Therefore, the structure 1 is capable of preventing or reducing the distortion of the beam profile that could occur in cases where the delivery fiber 10 and the bridge fiber 20 are joined.

The following method can be employed as a method of producing the structure 1: a production method including the step of fusion splicing the delivery fiber 10 and the tapering section 21 of the bridge fiber 20 using an optical fiber fusion splicer.

The bridge fiber 20 includes the tapering section 21 in the shape of a truncated cone that decreases in diameter $\varphi_{BR1}$ with decreasing distance from the other end face 20B of the bridge fiber 20. Therefore, the heat capacity of a portion around the other end face 20B is less than that of a bridge fiber that does not include the tapering section 21 (that is, a bridge fiber in the shape of a circular rod). Therefore, in the present production method, it is possible to fusion splice the delivery fiber 10 and the tapering section 21 of the bridge fiber 20 using an optical fiber fusion splicer. The optical fiber fusion splicer is capable of carrying out fusion splicing while preventing or reducing the distortion that could occur in the beam profile of the laser beam $L_F$. Thus, the structure 1 produced through the present production method is capable of outputting a laser beam $L_F$ that has a beam profile with no or little distortion.

Furthermore, in a case where the delivery fiber 10 and the tapering section 21 of the bridge fiber 20 are fusion spliced using an optical fiber fusion splicer, the diameter $\varphi_{BR1}$ at the delivery fiber 10-side end face (other end face 20B) of the bridge fiber 20 may be included within a predetermined range within which fusion splicing using an optical fiber fusion splicer can be carried out.

Since the diameter $\varphi_{BR1}$ at the other end face 20B is included within a predetermined range within which fusion splicing using an optical fiber fusion splicer can be carried out, the delivery fiber 10 and the bridge fiber 20 can be fusion spliced reliably. The predetermined range within which fusion splicing using an optical fiber fusion splicer can be carried is a predetermined range specific to each optical fiber fusion splicer, and an example thereof is the range of 50 μm to 1000 μm, inclusive. Note that, in a case where the optical fiber fusion splicer used in the present production method is a commercially available optical fiber fusion splicer, the predetermined range within which fusion splicing using the optical fiber fusion splicer can be carried out is stated in the instruction manual or specification sheet coming with the optical fiber fusion splicer.

Figure 2:
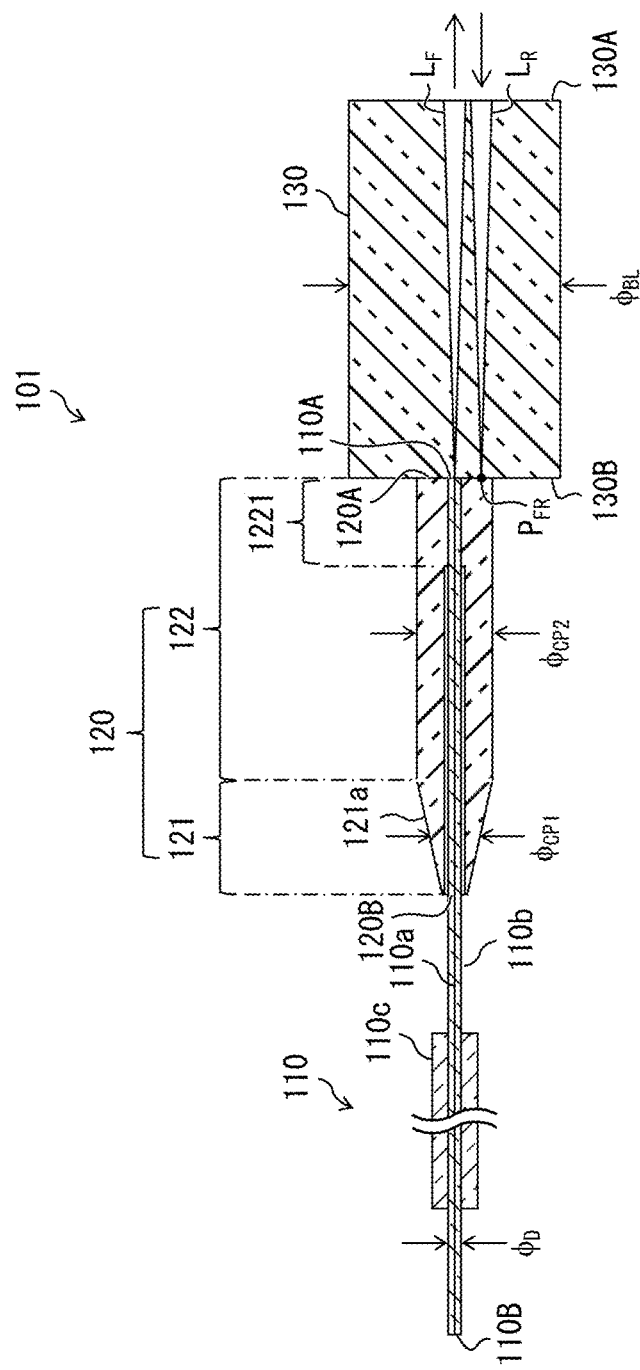

The following description will discuss a structure 101 in accordance with one or more embodiments of the present invention, with reference to FIG. 2. FIG. 2 is a longitudinal cross-sectional view of the structure 101.

As illustrated in FIG. 2, the structure 101 includes a delivery fiber 110, a small glass tube 120, and a glass block 130. The delivery fiber 110 and the small glass tube 120 are one or more embodiments of the optical fiber recited in the claims. The structure 101 functions as an output head of a laser apparatus, as with the structure 1.

The other end face 130B of the glass block 130 has, joined (e.g., fusion spliced) thereto, one end face 110A of the delivery fiber 110 (one end face of the optical fiber) and one end face 120A of the small glass tube 120. The other end face 110B of the delivery fiber 110 (other end face of the optical fiber) can be joined (for example, fusion spliced) to an output port of a laser light source.

The delivery fiber 110 has the same configuration as the delivery fiber 10 illustrated in FIG. 1. Specifically, the delivery fiber 110 includes a core 110a, a cladding 110b, and a coating 110c. The core 110a, the cladding 110b, and the coating 110c correspond to the core 10a, the cladding 10b, and the coating 10c of the delivery fiber 10, respectively.

Note, however, that the one end face 10A of the delivery fiber 10 is joined to the other end face 20B of the bridge fiber 20. In contrast, the one end face 110A of the delivery fiber 110 is inserted through a small hole in the small glass tube 120 (described later), and the outer surface of the delivery fiber 110 near the end face 110A is joined (for example, fusion spliced) to the inner surface of the small glass tube 120 near the one end face 120A. In addition, the one end face 110A of the delivery fiber 110 is joined (for example, fusion spliced) to the other end face 130B of the glass block 130 together with the one end face 120A of the small glass tube 120. The delivery fiber 110 differs from the delivery fiber 10 in the above regard.

The small glass tube 120 is a member that corresponds to the large-diameter cladding 20b of the bridge fiber 20 illustrated in FIG. 1. The small glass tube 120 is a structure that is composed of glass (for example, quartz glass) and that is in the form of a tube (for example, circular tube). In one or more embodiments, there is a small hole substantially at the central axis of the small glass tube 120. The small glass tube 120 is configured such that the internal diameter of the small hole is slightly larger than the diameter $\varphi_D$ of the delivery fiber 110. That is, the internal diameter of the small hole is very small. Therefore, the small glass tube 120 is also called a capillary tube (capillary). The small glass tube 120 is doped with a dopant for making the refractive index of the core 110a larger than the refractive index of the small glass tube 120 or for making the refractive index of the small glass tube 120 smaller than the refractive index of the core 110a. The refractive index of the small glass tube 120 may be equal to or substantially equal to the refractive index of the cladding 110b (the refractive indices are equal in the embodiments described here).

The small glass tube 120, which has the delivery fiber 110 inserted in its small hole, is heated at the one end face 120A and its surrounding area. The heating causes the inner surface in a section 1221 near the one end face 120A of the small glass tube 120 to be fusion spliced to the outer surface near the one end face 110A of the delivery fiber 110. In other words, at least part of the inner surface of the small glass tube 120 and at least part of the outer surface of a section of the delivery fiber 110 inserted in the small hole of the small glass tube 120 are fixed to each other by being fusion spliced. Thus, the small glass tube 120 covers the delivery fiber 110.

The one end face 110A and the one end face 120A, thus fusion spliced, are polished together, thereby obtaining the optical fiber recited in the claims. In one or more embodiments, the small glass tube 120 is attached to the delivery fiber 110 as described above, thereby achieving an increase in diameter of the optical fiber.

The small glass tube 120 is composed of: a tapering section 121 that includes other end face 120B; and a uniform-diameter portion 122 that includes the one end face 120A.

The tapering section 121 is configured such that the diameter $\varphi_{CP1}$ thereof increases with increasing distance from the other end face 120B. In one or more embodiments, the external shape of the tapering section 121 is a truncated cone whose diameter $\varphi_{CP1}$ increases with increasing distance from the other end face 120B and with decreasing distance from the one end face 120A.

The small glass tube 120 is configured such that the diameter $\varphi_{CP1}$ at the other end face 120B is substantially equal to the diameter $\varphi_D$ of the delivery fiber 10. The diameter $\varphi_{CP1}$ at the other end face 120B is, for example, 400 μm. The diameter $\varphi_{CP1}$ at the uniform-diameter portion 122-side end plane of the tapering section 121 is, for example, 4 mm.

The uniform-diameter portion 122 is configured such that the diameter $\varphi_{CP2}$ thereof is substantially uniform throughout the whole length from the tapering section 121-side end plane to the one end face 120A. In one or more embodiments, the uniform-diameter portion 122 is in the shape of an annular ring. The diameter $\varphi_{CP2}$ of the uniform-diameter portion 122 is, for example, 4 mm.

A section of the delivery fiber 110 to which section the small glass tube 120 is attached is one or more embodiments of the large-diameter section recited in the claims.

The tapering section 121 is configured such that the angle between its sloping surface 121a and the optical axis of the delivery fiber 110 is more than 0° and less than 90°. The small glass tube 120 has the delivery fiber 110 inserted in its small hole. Therefore, unlike the case of the bridge fiber 20 illustrated in FIG. 1, the delivery fiber 110 and the small glass tube 120 cannot be fusion spliced using an optical fiber fusion splicer. Therefore, the angle between the sloping surface 121a and the optical axis of the delivery fiber 110 can be selected as appropriate without having to take into consideration the use of an optical fiber fusion splicer. In one or more embodiments, 15° is employed as an example of the angle between the sloping surface 121a and the optical axis of the delivery fiber 110, as with the case of the embodiments described above.

In one or more embodiments, the small glass tube 120, which has the tapering section 121 having an external shape of a truncated cone, is obtained from an originally annular ring-shaped glass tube by grinding a portion around the other end face of the annular ring-shaped glass tube into a cone. An appropriate selection of the grain size of a grindstone for use in grinding makes it possible to roughen the sloping surface 121a of the tapering section 121 like, for example, the surface of ground glass.

The glass block 130 has the same configuration as the glass block 30 illustrated in FIG. 1. Therefore, the descriptions of the glass block 130 are omitted in the embodiments described here.

[Summary of Structure 101]

The structure 101 configured as has been described brings about effects similar to those of the structure 1 illustrated in FIG. 1. Furthermore, as described earlier, in the structure 101, the optical fiber recited in the claims may comprise: a delivery fiber 110 which is substantially uniform in diameter $\varphi_D$; and a small glass tube 120 which covers the delivery fiber 110 and thereby forms a large-diameter section.

With the above configuration, the large-diameter section can be formed by inserting the delivery fiber 110 in the small hole of the small glass tube 120 and then fixing the delivery fiber 110 and the small glass tube 120. As such, the large-diameter section may be formed of the small glass tube 120.

Furthermore, as a method of producing the structure 101, the following production method can be employed: a production method including the steps of (i) inserting a delivery fiber 110 into a small hole in a small glass tube 120 and (ii) fixing at least part of the inner surface of the small glass tube 120 and at least part of the outer surface of a section of the delivery fiber 110 which section is inserted in the small hole of the small glass tube 120 by at least partially heating the small glass tube 120 having the delivery fiber 110 inserted therein. Through these steps, the small glass tube 120 and the delivery fiber 110 are united. Note that the fixing of the delivery fiber 110 and the small glass tube 120 may be carried out by fusion splicing.

As such, the section 1221 of the small glass tube 120 near the one end face 120A of the small glass tube 120 is fusion spliced to a part of the outer surface of the section of the delivery fiber 110 which section is inserted in the small hole of the small glass tube 120. Because of this, the small glass tube 120 is divided into the section 1221 fusion spliced to the delivery fiber 110 and the remaining portion excluding the section 1221. In the remaining portion excluding the section 1221, there is an air layer between the small glass tube 120 and the delivery fiber 110, unlike the section 1221. This structure makes it possible to eliminate or reduce the likelihood that reflected light $L_R$ which has re-entered the small glass tube 120 through the glass block 130 will re-enter the delivery fiber 110 and be propagated in the opposite direction.

In a case where the one end face 110A of the delivery fiber 110 and the one end face 120A of the small glass tube 120, in the small glass tube 120 having the delivery fiber 110 inserted therein, are not flush or substantially flush with each other, the step of polishing the one end face 110A of the delivery fiber 110 and the one end face 120A of the small glass tube 120 together may be carried out after fixing the inner surface of the small glass tube 120 and the outer surface of the delivery fiber 110 but before joining (fusion splicing, in the embodiments described here) the one end face 110A of the delivery fiber 110 and the one end face 120A of the small glass tube 120 to the other end face 130B of the glass block 130. Carrying out this step makes the one end face 110A and the one end face 120A flush or substantially flush with each other.

EXAMPLES

Figure 3:
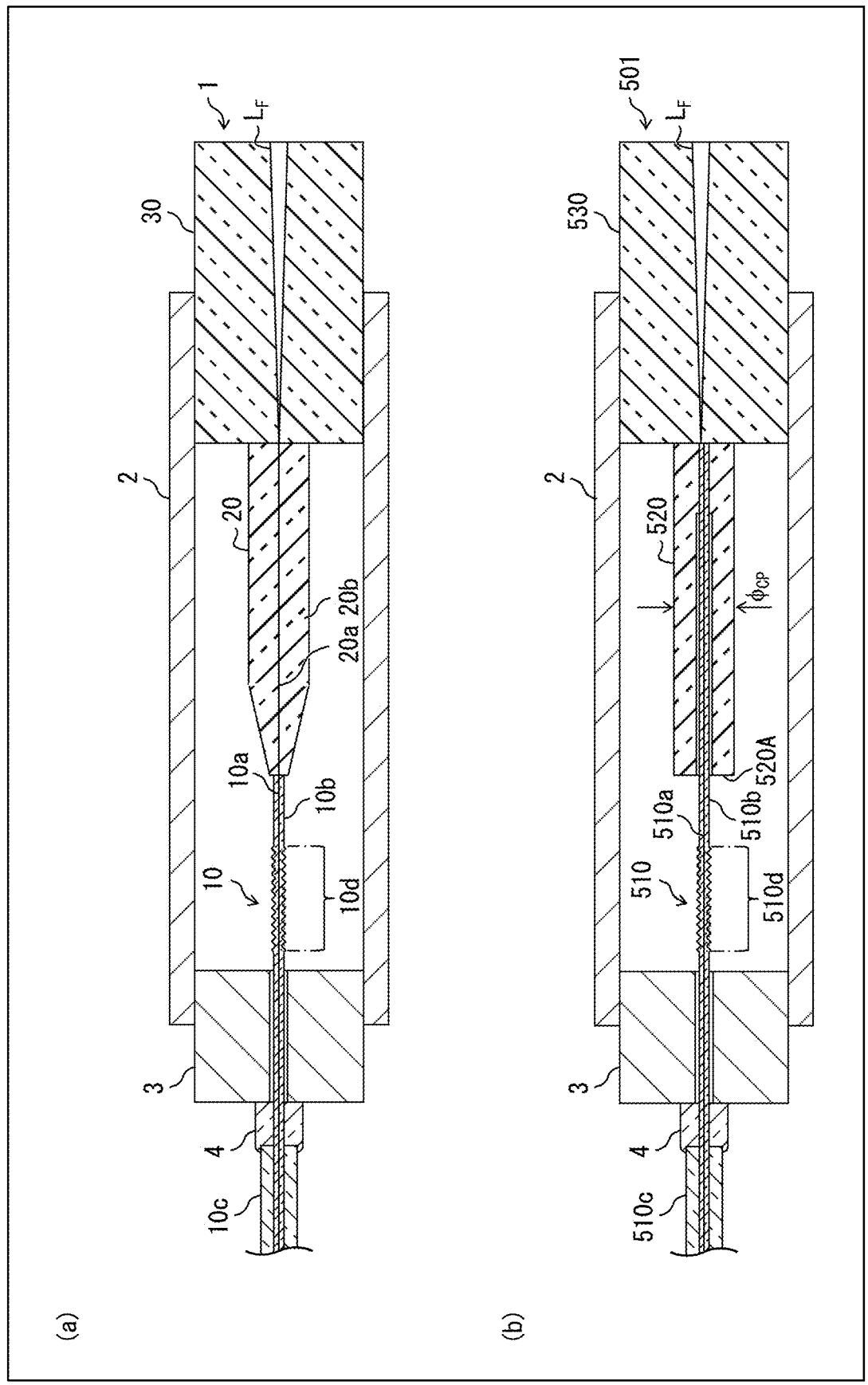
Figure 4:
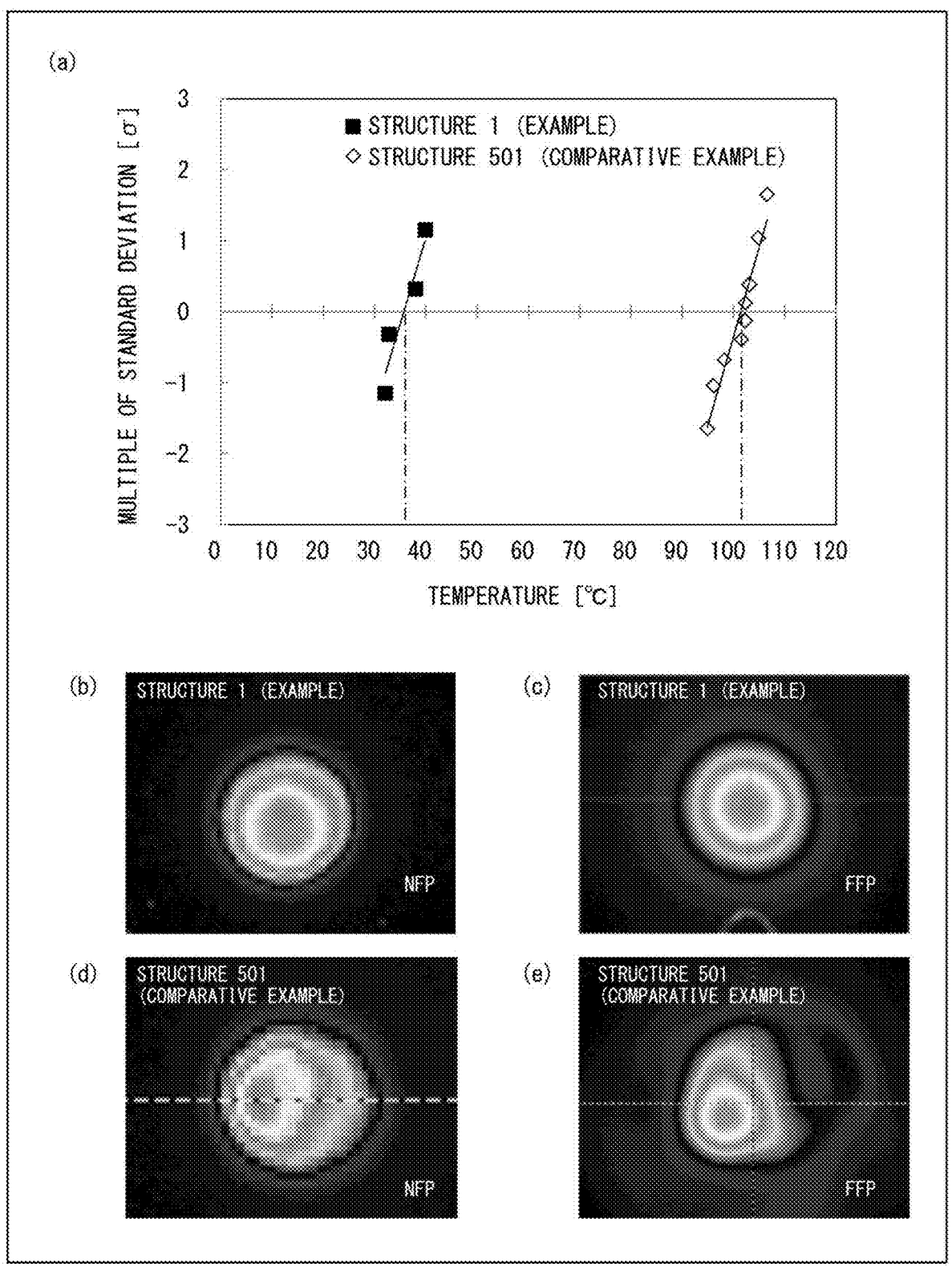

The following description will discuss Examples of the present invention with reference to FIGS. 3 and 4. (a) of FIG. 3 is a longitudinal cross-sectional view of an output head including a structure 1 used as an Example of the present invention. (b) of FIG. 3 is a longitudinal cross-sectional view of an output head including a structure 501 used as a Comparative Example for comparison with the present invention. (a) of FIG. 4 is a graph showing the temperature of a light damper 3 included in the structure 1 and the temperature of a light damper 3 included in the structure 501. (b) and (c) of FIG. 4 are images indicative of a near field pattern (hereinafter referred to as NFP) of a laser beam $L_F$ outputted from the structure 1 and a far field pattern (hereinafter referred to as FFP) of the laser beam $L_F$, respectively. (d) and (e) of FIG. 4 are images indicative of an NFP and an FFP of a laser beam $L_F$ outputted from the structure 501, respectively.

(Output Head Including Structure 1)

As illustrated in (a) of FIG. 3, an output head in accordance with the present Example includes the structure 1, a housing 2, the light damper 3, and a resin block 4.

The structure 1 is housed in a housing 2 in the shape of a circular tube. The housing 2 is made of copper, and has gold plating on the surface thereof. The housing 2 has, on the inner surface of the side wall thereof, a cooling tube for circulation of cooling water. Note that the cooling tube is not illustrated in (a) of FIG. 3. The metal for the housing 2 may be stainless steel instead of copper plated with gold.

One end of the housing 2 is sealed with the glass block 30, and the other end of the housing 2 is sealed with the light damper 3. The light damper 3 is based on a copper block in the shape of a circular rod, and is a copper block which has a small hole extending along the central axis substantially at the central axis. As illustrated in (a) of FIG. 3, the delivery fiber 10 passes through the small hole of the light damper 3 and is thereby externally introduced into the housing 2.

The surface of the cladding 10b in a section of the delivery fiber 10 which section is housed in the housing 2 is partially roughened, thereby forming a cladding mode stripper 10d. The cladding mode stripper 10d has the function of allowing cladding mode light, which is propagated within the cladding 10b, to escape outward from the cladding 10b. Since the cladding mode stripper 10d is formed in an intermediate portion of the delivery fiber 10, it is possible to eliminate or reduce the likelihood that reflected light $L_R$ which has re-entered the glass block 30 and re-entered the cladding 10b will be propagated through the delivery fiber 10 in the opposite direction.

The resin block 4 is a resin member obtained by allowing a resin having a refractive index higher than the refractive index of the cladding 10b to cure. The resin block 4 is placed so as to cover the delivery fiber 10, thereby fixing the delivery fiber 10 to the light damper 3. Furthermore, since the resin block 4 is composed of a resin that has a refractive index higher than the refractive index of the cladding 10b, the resin block 4 has the function of allowing reflected light $L_R$ which has re-entered the cladding 10b and has not been removed by the cladding mode stripper 10d to escape outward from the cladding 10b. That is, the resin block 4 functions as one or more embodiments of the cladding mode stripper. Since the resin block 4 is made of a resin having a refractive index higher than the refractive index of the cladding 10b, it is possible to further reduce the likelihood that the reflected light $L_R$ in the cladding mode, not removed by the cladding mode stripper 10d, will be propagated through the delivery fiber 10 in the opposite direction.

(Output Head Including Structure 501)

As illustrated in (b) of FIG. 3, the output head of the Comparative Example includes the structure 501, a housing 2, the light damper 3, and a resin block 4. The housing 2, the light damper 3, and the resin block 4 included in the output head of the Comparative Example are the same in configuration as the housing 2, the light damper 3, and the resin block 4 included in the output head of the present Example. Specifically, the structure 501 is housed in the housing 2, as with the structure 1 of the output head of the present Example as illustrated in (a) of FIG. 3. Also in the structure 501, the delivery fiber 510 passes through the small hole in the light damper 3 and is thereby externally introduced into the housing 2. A cladding mode stripper 510d is formed in a part of a section of the delivery fiber 510 which section is housed in the housing 2. A part of the delivery fiber 510 is fixed to the light damper 3 by the resin block 4.

A small glass tube 520 included in the structure 501 is based on the small glass tube 120 illustrated in FIG. 2. However, the small glass tube 520 differs from the small glass tube 120 in that the opposite end faces (in other words, opposite bases) are orthogonal to the central axis and the diameter $\varphi_{CP}$ thereof is substantially uniform throughout the whole length. In other words, the small glass tube 520 and the small glass tube 120 differ from each other in that the small glass tube 120 has the tapering section 121 whereas the small glass tube 520 has no tapering section. Note that the other end face 520A of the small glass tube 520 is roughened.

(Temperature of Light Damper 3)

The output head comprised of the structure 1 and the housing 2 was connected to a laser light source, and the temperature of the light damper 3 was measured while a laser beam $L_F$ at a predetermined power level was being applied to a workpiece. The horizontal axis in (a) of FIG. 4 indicates the temperature of the light damper 3.

In the present Example, a plurality of the structures 1 were prepared, and thereby the temperature of the light damper 3 while the laser beam $L_F$ at a predetermined power level was being applied to a workpiece was measured for each of a plurality of output heads. The vertical axis in (a) of FIG. 4 indicates a multiple of the standard deviation σ of the measured temperature of the light damper 3 measured for each of the plurality of output heads.

(a) of FIG. 4 also shows a straight line obtained by approximating the temperature dependence of the multiple of the standard deviation σ. The x intercept of the straight line indicates average temperature, which is the average of the temperatures of the light dampers 3 in the plurality of output heads. According to (a) of FIG. 4, the average temperature of the light dampers 3 was about 37° C.

In (a) of FIG. 4, the temperatures of the light dampers 3 measured in the same manner using the output heads of the Comparative Example comprised of the structure 501 and the housing 2 were also plotted. According to (a) of FIG. 4, the average temperature of the light dampers 3 in the output heads of the Comparative Example was about 100° C.

As has been described, it was found that the structure 1 including the bridge fiber 20 is capable of significantly (about 60° C. in the present Example) reducing the temperature of the light damper 3 compared to the structure 501 including the small glass tube 520.

(Beam Profile)

According to (b) and (c) of FIG. 4, with regard to the beam profile of the laser beam $L_F$ outputted from the output head including the structure 1, both the NFP and FFP are in the shape of concentric circles. It was found from this that the beam profile little distorted.

On the contrary, according to (d) and (e) of FIG. 4, with regard to the beam profile of the laser beam $L_F$ outputted from the output head including the structure 501, both the NFP and FFP are eccentric. It was found from this that the beam profile significantly distorted. It is inferred that the distortion of the beam profile results from a lateral pressure which occurs as a part of the small glass tube 520 melts and then solidifies again and which is caused by a force generated while the melted small glass tube 520 shrinks.

The structure 1 includes the delivery fiber 10 and the bridge fiber 20, and therefore is capable of preventing the beam profile from distorting due to the use of the small glass tube.

Furthermore, in the structure 1, an optical fiber fusion splicer for use in fusion splicing optical fibers is used to fusion splice the delivery fiber 10 and the bridge fiber 20. Therefore, the structure 1 is capable of preventing the distortion of the beam profile that would result when the delivery fiber 10 and the bridge fiber 20 are fusion spliced.

REFERENCE EMBODIMENTS

A structure in accordance with one or more reference embodiments of the present invention may be configured as described below.

A structure in accordance with one or more reference embodiments of the present invention is a structure that includes: an optical fiber; and a glass block joined to one end face of the optical fiber. In the present structure, a section of the optical fiber which section includes the one end face and which is larger in diameter than the remaining portion excluding that section is a large-diameter section, and the end face at the opposite end of the large-diameter section from the glass block is roughened.

For example, in a case where the large-diameter section is formed using a bridge fiber, the bridge fiber may have the shape of a circular rod configured such that the circular rod includes no tapering section and the opposite end faces of the circular rod are orthogonal to the optical axis of the optical fiber. Alternatively, in a case where the large-diameter section is formed using a small glass tube, the small glass tube may have the shape of an annular ring configured such that the opposite end faces of the annular ring are orthogonal to the optical axis of the optical fiber.

In the present structure, the one end face of the large-diameter section is joined to the glass block. Therefore, the present structure is capable of increasing the strength of the joint where the optical fiber and the glass block are joined, compared to a conventional structure in which the delivery fiber is directly joined to the glass block.

In addition, since the end face at the opposite end of the bridge fiber or small glass tube from the glass block is roughened, reflected light leaking out of the bridge fiber or small glass tube through the roughened end face is scattered in various directions. In other words, the present structure is capable of dispersing the propagation direction of the leaked reflected light. Therefore, in a case where the present structure is used together with the housing 2, the light damper 3, and the resin block 4 as illustrated in (a) of FIG. 3 to form an optical head, it is possible to reduce the power of reflected light which has leaked out through the end face at the opposite end of the foregoing bridge fiber or small glass tube from the glass block and which is applied to the light damper 3. As a result, it is possible to reduce an increase in the temperature of the light damper 3 compared to a case where the end face at the opposite end of the foregoing bridge fiber or small glass tube from the glass block is not roughened, and thus possible to prevent or reduce the effect of the reflected light on the coating of the optical fiber, the resin block 4 fixing the optical fiber, and the like.

A structure in accordance with one or more reference embodiments of the present invention is a structure that includes: a delivery fiber; a bridge fiber joined to one end face of the delivery fiber; and a glass block joined to one end face of the bridge fiber. In the present structure, the bridge fiber is configured such that the diameter of the cladding thereof is larger than the diameter of the cladding of the delivery fiber.

The present structure employs a bridge fiber configured such that the diameter of the cladding thereof is larger than the diameter of the cladding of the delivery fiber, and the one end face of the bridge fiber is joined to the glass block. Therefore, the present structure is capable of increasing the strength of the joint where the bridge fiber and the glass block are joined, compared to a conventional structure in which the delivery fiber is directly joined to the glass block.

In addition, since the diameter of the cladding of the bridge fiber is larger than the diameter of the cladding of the delivery fiber, it is not necessary to fix (for example, fusion splice) a small glass tube to the outer surface of the delivery fiber to cover the outer surface in order to increase the diameter of the delivery fiber. In a case where the delivery fiber and the small glass tube are fusion spliced, a lateral pressure may occur on the outer surface of the small glass tube, and the beam profile of a laser beam may distort due to the lateral pressure. As described earlier, the present structure eliminates the need for joining the delivery fiber and the small glass tube, and is therefore capable of preventing or reducing the distortion that would occur in the beam profile.

(Configuration of Fiber Laser System)

Figure 5:
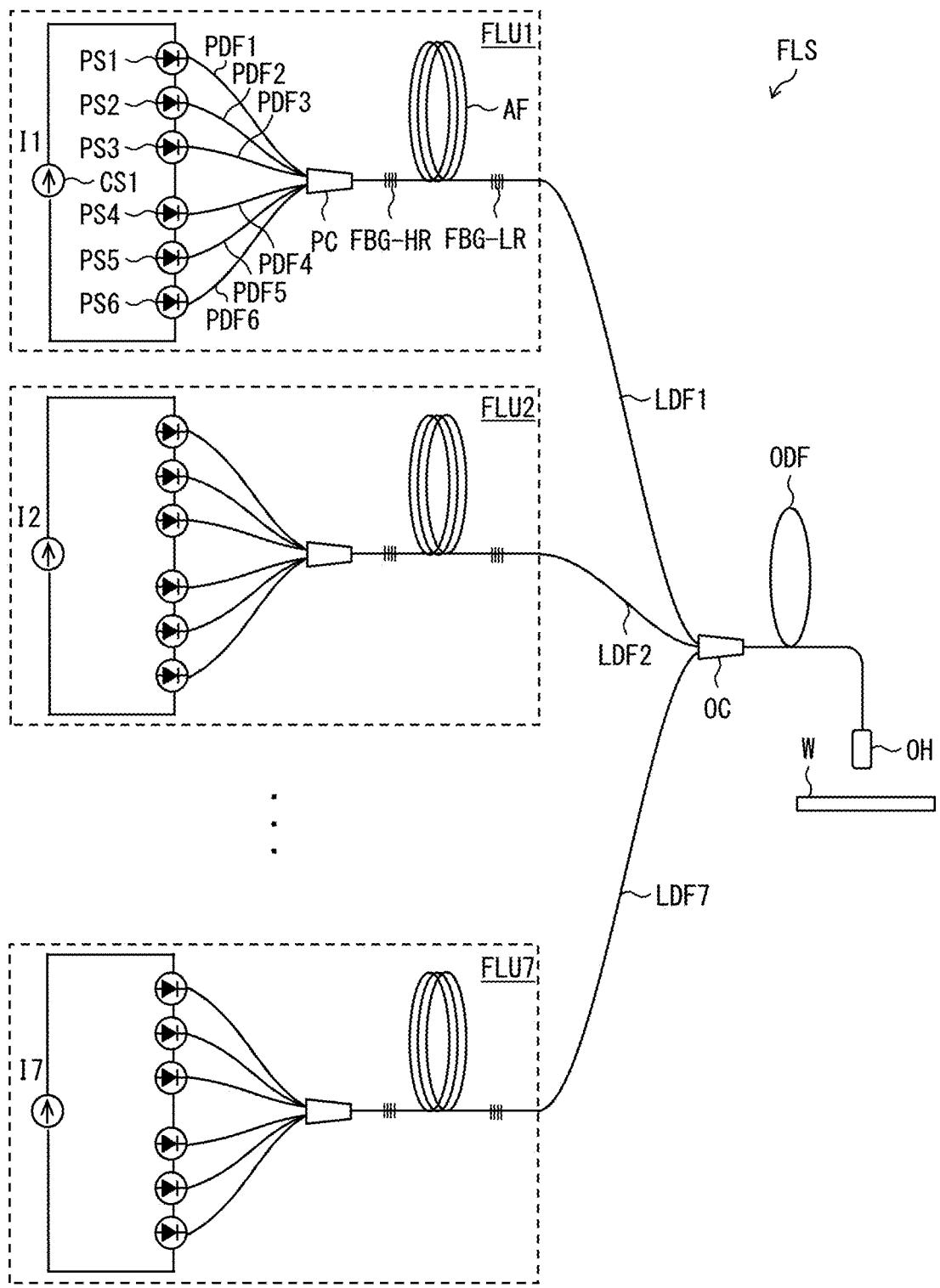
FIG. 5 is a block diagram illustrating a fiber laser system in accordance with one or more embodiments of the present invention.

The following description will discuss a fiber laser system FLS in accordance with one or more embodiments of the present invention with reference to FIG. 5. FIG. 5 illustrates a configuration of the fiber laser system FLS. The fiber laser system FLS includes an output head OH.

The fiber laser system FLS is a laser apparatus to process a workpiece W, which is to be processed. As illustrated in FIG. 5, the fiber laser system FLS includes n fiber laser units FLU1 to FLUn, n laser delivery fibers LDF1 to LDFn, an output combiner OC, an output delivery fiber ODF, and an output head OH. The fiber laser units FLU1 to FLUn and the laser delivery fibers LDF1 to LDFn are in one-to-one correspondence with each other. It is noted here that n is a natural number of 1 or more, and represents the number of the fiber laser units FLU1 to FLUn and the number of the laser delivery fibers LDF1 to LDFn. Note that FIG. 5 shows an example of a configuration of the fiber laser system FLS in a case where n=7. The output combiner OC is one or more embodiments of the combining section recited in the claims, and includes n input ports and one output port. The output combiner OC combines n laser beams inputted into the respective input ports into one laser beam, and outputs the combined laser beam through the output port.

The output delivery fiber ODF of the fiber laser system FLS corresponds to the delivery fiber 10 of the structure 1 illustrated in FIG. 1. The output head OH of the fiber laser system FLS houses the delivery fiber 10, the bridge fiber 20, and the glass block 30 of the structure 1 illustrated in FIG. 1.

Note that the output head OH may house the delivery fiber 110, the small glass tube 120, and the glass block 130 of the structure 101 illustrated in FIG. 2, instead of the delivery fiber 10, the bridge fiber 20, and the glass block 30 of the structure 1 illustrated in FIG. 1.

Each of the fiber laser units FLUi (i is a natural number of 1 or more) emits a laser beam. In one or more embodiments, forward-pumping fiber lasers are used as the fiber laser units FLU1 to FLUn. Each fiber laser unit FLUi is connected to an input end of a corresponding laser delivery fiber LDFi. A laser beam emitted by the fiber laser unit FLUi is inputted into the laser delivery fiber LDFi.

The laser delivery fiber LDFi guides the laser beam emitted by the corresponding fiber laser unit FLUi. The laser delivery fibers LDF1 to LDFn may each be a single mode fiber or a few-mode fiber with ten or less modes.

In one or more embodiments, few-mode fibers are used as the laser delivery fibers LDF1 to LDFn. The output end of each laser delivery fiber LDFi is connected to a corresponding input port of the output combiner OC. A laser beam emitted by the fiber laser unit FLUi and guided through the corresponding laser delivery fiber LDFi is inputted into the output combiner OC through the input port.

The output combiner OC combines laser beams emitted by the respective fiber laser unit FLU1 to FLUn and guided through the respective laser delivery fibers LDF1 to LDFn. The output port of the output combiner OC is connected to the input port of the output delivery fiber ODF. The laser beam, into which the laser beams have been combined by the output combiner OC, is inputted into the output delivery fiber ODF. That is, the entrance face of the output delivery fiber ODF is coupled to the plurality of fiber laser units FLUi through the output combiner OC.

The output delivery fiber ODF guides the laser beam, into which the laser beams have been combined by the output combiner OC. In one or more embodiments, a multi-mode fiber is used as the output delivery fiber ODF. The output end of the output delivery fiber ODF is connected to the output head OH. Furthermore, a spatial optical system (for example, a convex lens, which is not illustrated in FIG. 5) is provided between the output head OH and the workpiece W for the laser beam outputted from the output head OH to converge at the surface of the workpiece W. The laser beam, into which the laser beams have been combined by the output combiner OC, is outputted from the output head OH, caused to converge by the spatial optical system, and then applied to the workpiece W.

Note that, in one or more embodiments, the output combiner OC is employed as an example of the combining section recited in the claims. However, in one or more embodiments of the present invention, a spatial optical system including a plurality of convex lenses can be employed as an example of the combining section recited in the claims. In a case where the spatial optical system comprises n convex lenses, the convex lenses need only be arranged such that laser beams outputted from the laser delivery fibers LDFi of the respective fiber laser units FLUi converge and the converged laser beams are coupled to the core of the output delivery fiber ODF.

(Configuration of Fiber Laser Unit)

A configuration of the fiber laser unit FLU1 included in the fiber laser system FLS is described with further reference to FIG. 5. Note that the fiber laser units FLU2 to FLUn also have the same configuration as the fiber laser unit FLU1.

The fiber laser unit FLU1 is a forward-pumping fiber laser, and, as illustrated in FIG. 5, includes in pump light sources PS1 to PSm, m pump delivery fibers PDF1 to PDFm, a pump combiner PC, a high-reflection fiber Bragg grating FBG-HR, an amplifying fiber AF, and a low-reflection fiber Bragg grating FBG-LR. That is, the fiber laser unit FLU1 is a resonator-type fiber laser unit. The pump light sources PS1 to PSm and the pump delivery fiber PDF1 to PDFm are in one-to-one correspondence with each other. It is noted here that m is a natural number of 2 or more, and represents the number of the pump light sources PS1 to PSm and the number of the pump delivery fibers PDF1 to PDFm. Note that FIG. 5 shows an example of a configuration of the fiber laser unit FLU1 in a case where m=6.

Each of the pump light sources PSj (j is a natural number of 1 or more and m or less) emits pump light. In one or more embodiments, laser diodes are used as the pump light sources PS1 to PSm. Each pump light source PSj is connected to the input end of a corresponding pump delivery fiber PDFj. The pump light emitted by the pump light source PSj is inputted into the pump delivery fiber PDFj.

The pump delivery fiber PDFj guides the pump light emitted by the corresponding pump light source PSj. The output end of the pump delivery fiber PDFj is connected to an input port of the pump combiner PC. The pump light emitted by the pump light source PSj and guided through the pump delivery fiber PDFj is inputted into the pump combiner PC through the input port.

The pump combiner PC combines beams of pump light emitted by the respective pump light sources PS1 to PSm and guided through the respective pump delivery fibers PDF1 to PDFm. The output port of the pump combiner PC is connected to the input end of the amplifying fiber AF through the high-reflection fiber Bragg grating FBG-HR. The pump light which has been combined by the pump combiner PC and which has passed through the high-reflection fiber Bragg grating FBG-HR is inputted into the amplifying fiber AF.

The amplifying fiber AF emits a laser beam using the pump light which has passed through the high-reflection fiber Bragg grating FBG-HR. In one or more embodiments, a double-clad fiber having a core doped with a rare-earth element (for example, Yb) (Raman gain coefficient=$1 \times 10^{-13}$ [1/W]) is used as the amplifying fiber AF. The pump light which has passed through the high-reflection fiber Bragg grating FBG-HR is used to keep the rare-earth element in population inversion state. The output end of the amplifying fiber AF is connected to the input end of the laser delivery fiber LDF1 through the low-reflection fiber Bragg grating FBG-LR. The high-reflection fiber Bragg grating FBG-HR functions as a mirror at a certain wavelength λ (for example, 1060 nm) (reflectivity is, for example, 99%), and the low-reflection fiber Bragg grating FBG-LR functions as a half mirror at that wavelength λ (reflectivity is, for example, 10%). Therefore, the amplifying fiber AF, together with the high-reflection fiber Bragg grating FBG-HR and the low-reflection fiber Bragg grating FBG-LR, forms a resonator that oscillates a laser beam of wavelength k. A laser beam which has been emitted by the amplifying fiber AF and which has passed through the low-reflection fiber Bragg grating FBG-LR is inputted into the laser delivery fiber LDF1.

Note that, although forward-pumping fiber lasers are used as the fiber laser units FLU1 to FLUn in one or more embodiments, the present invention is not limited to such. Specifically, in the present invention, backward-pumping fiber lasers can be used as the fiber laser units FLU1 to FLUn, and bidirectional-pumping fiber lasers can be used as the fiber laser units FLU1 to FLUn.

The fiber laser system FLS configured as has been described brings about the same effects as those of the structure 1 described in the embodiments described above and the structure 101 described in the embodiments described above.

Note that, in one or more embodiments, the fiber laser system FLS employs resonator-type fiber laser units as the fiber laser units FLU1 to FLUn (which are each the laser unit recited in the claims). However, the fiber laser system FLS can employ MOPA-type fiber laser units as the respective fiber laser units FLU1 to FLUn. A MOPA-type fiber laser unit includes a master oscillator (MO) section and a power amplifier (PA) section provided downstream of the MO section. The MO section emits seed light, and the PA section emits a laser beam by amplifying the power of the seed light. Note that, in the MOPA-type fiber laser unit, the MO section may be a resonator-type fiber laser unit or may be any of the following: a semiconductor laser unit, a solid laser unit, a liquid laser unit, and a gas laser unit.

The fiber laser system FLS may employ, as the laser unit recited in the claims, any of the following: a semiconductor laser unit, a solid laser unit, a liquid laser unit, and a gas laser unit.

(Summary of Fiber Laser System FLS)

The fiber laser system FLS, which is one or more embodiments of the laser system recited in the claims, is a laser system (fiber laser system FLS) that includes: one or more laser units (fiber laser units FLU1 to FLUn) configured to output respective one or more laser beams; a combining section (output combiner OC) configured to combine the one or more laser beams outputted from the respective one or more laser units (fiber laser unit FLU1 to FLUn) into one; and a structure 1 or 101 in accordance with one or more embodiments of the present invention, in which the other end face of the optical fiber (delivery fiber 10, 110) is optically coupled to the combining section (output combiner OC).

The structure 1 or 101 in accordance with one or more embodiments of the present invention is capable of reducing the distortion that could occur in a beam profile, and therefore the fiber laser system FLS is capable of applying a laser beam having a beam profile with no or little distortion to a workpiece. Thus, the fiber laser system FLS makes it possible to improve processing accuracy when processing the workpiece and to improve the finished quality of the processed product.

(Configuration of Fiber Laser Apparatus)

Figure 6:
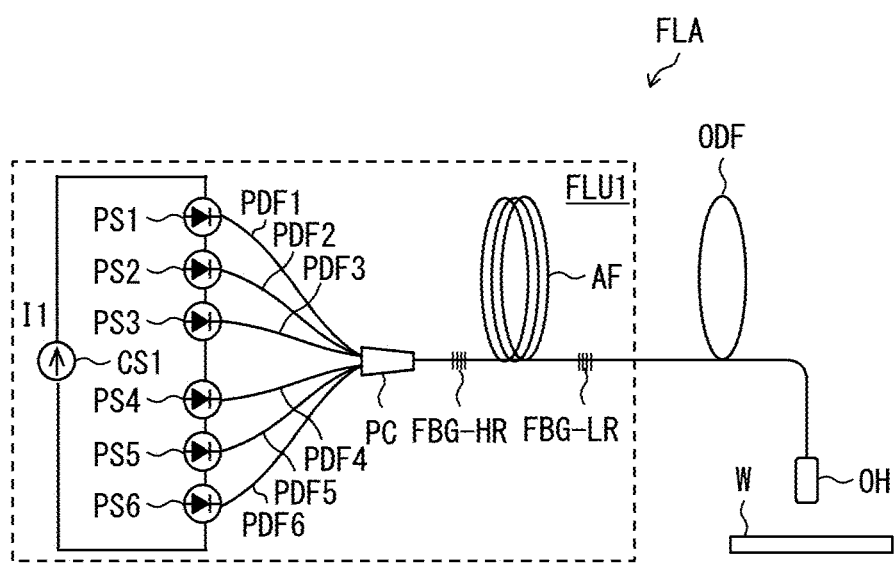
FIG. 6 is a block diagram illustrating a fiber laser apparatus in accordance with one or more embodiments of the present invention.

The following description will discuss a fiber laser apparatus FLA in accordance with one or more embodiments of the present invention, with reference to FIG. 6. FIG. 6 illustrates a configuration of the fiber laser apparatus FLA. The fiber laser apparatus FLA includes a fiber laser unit FLU1 and an output head OH.

An output delivery fiber ODF of the fiber laser apparatus FLA corresponds to the delivery fiber 10 of the structure 1 illustrated in FIG. 1. The output head OH of the fiber laser system FLS houses the delivery fiber 10, the bridge fiber 20, and the glass block 30 of the structure 1 illustrated in FIG. 1.

Note that the output head OH may house the delivery fiber 110, the small glass tube 120, and the glass block 130 of the structure 101 illustrated in FIG. 2, instead of the delivery fiber 10, the bridge fiber 20, and the glass block 30 of the structure 1 illustrated in FIG. 1.

As illustrated in FIG. 6, the fiber laser unit FLU1 included in the fiber laser apparatus FLA has the same configuration as the fiber laser unit FLU1 included in the fiber laser system FLS (see FIG. 5). Therefore, descriptions of the fiber laser unit FLU1 are omitted in the embodiments described here.

Furthermore, the fiber laser apparatus FLA eliminates the need for combining laser beams emitted by a plurality of fiber laser units FLU1 to FLUn, unlike the fiber laser system FLS. Therefore, the fiber laser apparatus FLA does not need to include the output combiner OC, which is included in the fiber laser system FLS. As a result, in the fiber laser apparatus FLA, the entrance end face of the output delivery fiber ODF is coupled to the fiber laser unit FLU1. Note that, as with the case of the fiber laser system FLS, the fiber laser apparatus FLA may employ a resonator-type fiber laser unit as the fiber laser unit FLU1 or may employ a MOPA-type fiber laser unit as the fiber laser unit FLU1. Note that, in a case where the fiber laser apparatus FLA employs a MOPA-type fiber laser unit as the fiber laser unit FLU1, the MO section may be a resonator-type fiber laser unit or may be any of the following: a semiconductor laser unit, a solid laser unit, a liquid laser unit, and a gas laser unit. Furthermore, the fiber laser apparatus FLA may employ, as the laser unit recited in the claims, any of the following: a semiconductor laser unit, a solid laser unit, a liquid laser unit, and a gas laser unit.

The fiber laser apparatus FLA configured as has been described brings about the same effects as those of the structure 1 described in the embodiments described above and the structure 101 described in the embodiments described above.

The entrance end face of the output delivery fiber ODF (delivery fiber 10 or 110) included in the structure 1 or 101 which is one or more embodiments of the present invention can be connected to at least one of the fiber laser units FLU1 to FLUn through the output combiner OC as illustrated in FIG. 5 or can be coupled to one fiber laser unit FLU1 as illustrated in FIG. 6.

(Summary of Fiber Laser Apparatus FLA)

The fiber laser apparatus FLA, which is one or more embodiments of the laser apparatus recited in the claims, is a laser apparatus (fiber laser apparatus FLA) that includes: a laser unit FLU1 configured to output a laser beam; and a structure 1 or 101 in accordance with one or more embodiments of the present invention, in which the other end face of the optical fiber (delivery fiber 10 or 110) is optically coupled to the laser unit (fiber laser unit FLU1).

The fiber laser apparatus FLA configured as described above brings about the same effects as the fiber laser system FLS illustrated in FIG. 5. Therefore, descriptions of the effects are omitted in the embodiments described here.

Aspects of the present invention can also be expressed as follows:

A structure in accordance with one or more embodiments of the present invention is a structure including an optical fiber and a glass block joined to one end face of the optical fiber, the optical fiber including a large-diameter section which includes the one end face and which is larger in diameter than the remaining portion excluding the large-diameter section, the large-diameter section including a tapering section which has, as part of a surface thereof, a sloping surface sloping at an angle of more than 0° and less than 90° to an optical axis of the optical fiber and which is located in a portion other than the one end face.

With the above configuration, the diameter at the one end face of the optical fiber joined to the glass block is larger than the diameter at the other end face of the optical fiber. Therefore, the present structure is capable of increasing the strength of the joint where the optical fiber and the glass block are joined, compared to a conventional structure in which the optical fiber is directly joined to the glass block.

In addition, with the above configuration, the large-diameter section which is larger in diameter than the other end face of the optical fiber is provided in a portion including the one end face of the optical fiber, and the large-diameter section includes the tapering section. Therefore, the propagation direction of reflected light which has entered the glass block and which has not re-entered the optical fiber is refracted at the sloping surface which is part of the surface of the tapering section, and is diverted from a direction along the optical axis of the optical fiber. Thus, the present structure is capable of preventing or reducing the effect of the reflected light on the coating of the optical fiber, members around the fiber, and the like.

As such, the present structure is capable of, in the structure that includes the optical fiber and the glass block joined to the one end face of the optical fiber, increasing the strength of the joint where the optical fiber and the glass block are joined, and further capable of preventing or reducing the effect of reflected light on the coating of the optical fiber and the like.

The structure in accordance with one or more embodiments of the present invention may be configured such that the tapering section is in the shape of a truncated cone that increases in diameter with decreasing distance from the one end face.

With the above configuration, since the tapering section is in the shape of a truncated cone, the tapering section is configured to be isotropic about the optical axis of the optical fiber. Therefore, reflected light, refracted by the sloping surface of the tapering section and thereby leaks out of the glass block, leaks out of the optical fiber isotropically about the optical axis. Thus, the present structure is capable of dispersing the leaked reflected light, and thus capable of further reducing the effect of the reflected light on the coating of the optical fiber and the like.

The structure in accordance with one or more embodiments of the present invention may be configured such that the sloping surface of the tapering section is at least partially roughened.

With the above configuration, since the sloping surface of the tapering section is roughened, reflected light which leaks out of the glass block through the sloping surface of the tapering section is scattered in various directions. Therefore, the present structure is capable of dispersing the leaked reflected light, and thus capable of further reducing the effect of the reflected light on the coating of the optical fiber and the like.

The structure in accordance with one or more embodiments of the present invention may be configured such that the optical fiber comprises: a delivery fiber which is substantially uniform in diameter; and a bridge fiber which is located between the delivery fiber and the glass block and which forms the large-diameter section.

With the above configuration, the bridge fiber located between the delivery fiber and the glass block can be used to form the large-diameter section. The formation of the large-diameter section using the bridge fiber makes it possible to prevent or reduce the distortion of the beam profile compared to cases where a small glass tube is used to form the large-diameter section.

The structure in accordance with one or more embodiments of the present invention may be configured such that the optical fiber comprises: a delivery fiber which is substantially uniform in diameter; and a small glass tube which covers the delivery fiber and thereby forms the large-diameter section.

With the above configuration, the large-diameter section can be formed by inserting the delivery fiber in the small glass tube and then fixing the delivery fiber and the small glass tube. As such, the large-diameter section may be formed of the small glass tube.

A laser apparatus in accordance with one or more embodiments of the present invention includes: a laser unit configured to output a laser beam; and the structure in accordance with any one of the embodiments of the present invention, in which the other end face of the optical fiber is optically coupled to the laser unit.

A laser system in accordance with one or more embodiments of the present invention includes: one or more laser units configured to output respective one or more laser beams; a combining section configured to combine the one or more laser beams outputted from the respective one or more laser units into one; and the structure in accordance with any one of the embodiments of the present invention, in which the other end face of the optical fiber is optically coupled to the combining section.

The structure in accordance with one or more embodiments of the present invention is capable of reducing the distortion that would occur in a beam profile, and therefore the present laser apparatus and the present laser system are each capable of applying a laser beam having a beam profile with no or little distortion to a workpiece. Thus, the present laser apparatus and the present laser system are each capable of improving processing accuracy when processing the workpiece and improving the finished quality of the processed product.

A production method in accordance with one or more embodiments of the present invention is a method of producing a structure that includes: a delivery fiber; a bridge fiber which is joined to one end face of the delivery fiber and which is larger in diameter than the delivery fiber; and a glass block which is joined to one end face of the bridge fiber. In the structure, the bridge fiber includes a tapering section which has, as part of a surface thereof, a sloping surface sloping at an angle of more than 0° and less than 90° to an optical axis of the bridge fiber and which is located in a portion other than the one end face. In other words, in the structure, the bridge fiber includes a tapering section which is located near the other end face of the bridge fiber and which is in the shape of a truncated cone that decreases in diameter of the tapering section with decreasing distance from the other end face. The present production method includes the step of fusion splicing the delivery fiber and the tapering section of the bridge fiber with use of an optical fiber fusion splicer.

The bridge fiber used in the present production method includes the tapering section in the shape of a truncated cone that decreases in diameter of the bridge fiber with decreasing distance from the other end face of the bridge fiber. Therefore, the heat capacity of a portion around the other end face of the bridge fiber is less than that of a bridge fiber that includes no tapering section (that is, a bridge fiber in the shape of a circular rod). Therefore, in the present production method, it is possible to fusion splice the delivery fiber and the tapering section of the bridge fiber using an optical fiber fusion splicer. The optical fiber fusion splicer is capable of carrying out fusion splicing while preventing or reducing the distortion that could occur in the beam profile of the laser beam. Thus, the structure produced through the present production method is capable of outputting a laser beam that has a beam profile with no or little distortion.

A production method in accordance with one or more embodiments of the present invention is a method of producing a structure that includes: a delivery fiber; a small glass tube which covers a section including one end face of the delivery fiber; and a glass block which is joined to the one end face of the delivery fiber and which is joined to one end face of the small glass tube. In the structure, the small glass tube includes a tapering section which has, as part of a surface thereof, a sloping surface sloping at an angle of more than 0° and less than 90° to an optical axis of the delivery fiber and which is located in a portion other than the one end face. The present production method includes the steps of: inserting the delivery fiber into a small hole in the small glass tube; and fixing at least part of an inner surface of the small glass tube and at least part of an outer surface of a section of the delivery fiber which section has been inserted in the small hole by at least partially heating the small glass tube which has the delivery fiber inserted therein.

A structure in accordance with one or more embodiments of the present invention can be produced also by use of the present production method.

[Remarks]

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 101 structure
10, 110 delivery fiber (part of optical fiber)
10c, 110c coating
$\varphi_D$ diameter
20 bridge fiber (part of optical fiber)
120 small glass tube (part of optical fiber)
21, 121 tapering section
21a, 121a sloping surface
$\varphi_{BR1}$, $\varphi_{CP1}$ diameter
22 uniform-diameter portion
$\varphi_{BR2}$, $\varphi_{CP2}$ diameter
30, 130 glass block FLS fiber laser system (laser system)
FLA fiber laser apparatus (laser apparatus)
FLUi fiber laser unit (laser unit)
OC output combiner (combining section)

The invention claimed is:

1. A structure comprising:
an optical fiber comprising a large-diameter section that is larger in diameter than a remainder of the optical fiber, wherein a diameter of a core at the large-diameter section is equal or substantially equal to a diameter of a core at the remainder, and a portion covering the core at the large-diameter section is thicker than a cladding at the remainder; and
a glass block joined to a first end face of the large-diameter section of the optical fiber, wherein
the large-diameter section comprises a tapering section that:
comprises, as part of a surface thereof, a sloping surface sloping at an angle of more than 0° and less than 90° to an optical axis of the optical fiber; and
is disposed in a portion other than the first end face, and
a diameter of the tapering section increases with decreasing distance from the first end face.

2. The structure according to claim 1, wherein the tapering section has a shape of a truncated cone that linearly increases in diameter with a decreasing distance from the first end face.

3. The structure according to claim 1, wherein the sloping surface of the tapering section is at least partially roughened.

4. The structure according to claim 1, wherein the optical fiber comprises:
a delivery fiber that is substantially uniform in diameter; and
a bridge fiber that:
is disposed between the delivery fiber and the glass block; and
forms the large-diameter section, and
the portion covering the core at the large-diameter section is a cladding of the bridge fiber.

5. The structure according to claim 1, wherein the optical fiber comprises:
a delivery fiber that is substantially uniform in diameter; and
a small glass tube that covers the delivery fiber and forms the large-diameter section, and
the portion covering the core at the large-diameter section is the small glass tube.

6. A laser apparatus comprising:
a laser unit that outputs a laser beam; and
the structure according to claim 1, wherein
a second end face of the optical fiber is optically coupled to the laser unit.

7. A laser system comprising:
two or more laser units that each output a laser beam;
a combiner that combines laser beams outputted from the two or more laser units; and
the structure according to claim 1, wherein
a second end face of the optical fiber is optically coupled to the combiner.

* * * * *